US010536703B2

(12) United States Patent
Zhang et al.

(10) Patent No.: US 10,536,703 B2
(45) Date of Patent: Jan. 14, 2020

(54) METHOD AND APPARATUS FOR VIDEO QUALITY ASSESSMENT BASED ON CONTENT COMPLEXITY

(71) Applicant: InterDigital CE Patent Holdings, Paris (FR)

(72) Inventors: Fan Zhang, Beijing (CN); Ning Liao, Beijing (CN); Kai Xie, Beijing (CN); Zhibo Chen, Beijing (CN)

(73) Assignee: InterDigital CE Patent Holdings, Paris (FR)

( * ) Notice: Subject to any disclaimer, the term of this patent is extended or adjusted under 35 U.S.C. 154(b) by 801 days.

(21) Appl. No.: 14/424,067

(22) PCT Filed: Jun. 25, 2013

(86) PCT No.: PCT/CN2013/077846

§ 371 (c)(1),
(2) Date: Feb. 26, 2015

(87) PCT Pub. No.: WO2014/032463

PCT Pub. Date: Mar. 6, 2014

(65) Prior Publication Data

US 2015/0222905 A1 Aug. 6, 2015

(30) Foreign Application Priority Data

Aug. 27, 2012 (CN) ................. PCT/CN2012/080632

(51) Int. Cl.
*H04N 11/02* (2006.01)
*H04N 19/154* (2014.01)
(Continued)

(52) U.S. Cl.
CPC ......... *H04N 19/154* (2014.11); *H04N 19/114* (2014.11); *H04N 19/177* (2014.11); *H04N 19/192* (2014.11); *H04N 19/36* (2014.11)

(58) Field of Classification Search
CPC ............................ H04N 19/154; H04N 19/36
(Continued)

(56) References Cited

U.S. PATENT DOCUMENTS 5,389,973 A * 2/1995 Kitamura ............. H04N 5/9264 348/27
5,990,955 A * 11/1999 Koz ..................... H04N 19/176 375/240.01

(Continued)

FOREIGN PATENT DOCUMENTS

CN 101478691 7/2009
EP 2144449 1/2010

(Continued)

OTHER PUBLICATIONS

Wang et al., "Quality Estimation for H.264/SVC Inter-layer Residual Prediction in Spatial Scalability," PSIVT 2011, Part II, LNCS 7088, pp. 252-261, Springer-Verlag, Berlin, Heidelberg, DE, 2011.

(Continued)

*Primary Examiner* — Leron Beck
(74) *Attorney, Agent, or Firm* — Brian J. Dorini; Xiaon Lu

(57) ABSTRACT

To estimate content complexity of a video, energy of prediction residuals is calculated. The prediction residuals are usually smaller when the video is less complex and more predictable. Scales of prediction residuals also depend on encoding configurations, for example, I pictures usually have larger prediction residuals than P and B pictures even when the contents are very similar and thus have similar perceived content complexity. To more closely reflect the content complexity, alignment scaling factors are estimated for different encoding configurations. Based on the energy of prediction residuals and alignment scaling factors, an overall content unpredictability parameter can be estimated to compute a compression distortion factor for the video. The
(Continued)

I picture P picture B picture
Original pictures:
Raw CU map:

compression distortion factor, combined with slicing and freezing distortion factors, can be used to estimate a video quality metric for the video.

19 Claims, 5 Drawing Sheets

(51) Int. Cl.
*H04N 19/114* (2014.01)
*H04N 19/177* (2014.01)
*H04N 19/192* (2014.01)
*H04N 19/36* (2014.01)

(58) Field of Classification Search
USPC ........................................ 375/240.02–240.29
See application file for complete search history.

(56) References Cited

U.S. PATENT DOCUMENTS 6,078,701 A * 6/2000 Hsu .......................... G06K 9/32 375/E7.086
6,192,081 B1 * 2/2001 Chiang ................ H04N 19/176 375/240.05
6,707,954 B1 * 3/2004 Akamatsu ................ G06K 9/46 382/286
7,003,037 B1 2/2006 Bordes et al.
7,477,688 B1 * 1/2009 Zhang .................. H04N 19/159 375/240
7,702,168 B2 4/2010 Thoreau et al.
8,908,984 B2 * 12/2014 Carmel ................ H04N 19/176 375/240.13
9,445,110 B2 * 9/2016 Leontaris ............. H04N 19/176
2003/0053543 A1 * 3/2003 Bhaumik ............... H04N 5/145 375/240.16
2004/0190633 A1 * 9/2004 Ali ........................ H04N 17/004 375/240.29
2005/0105615 A1 * 5/2005 El-Maleh ............. H04N 19/139 375/240.12
2008/0008249 A1 * 1/2008 Yan ........................ H04N 19/80 375/240.21
2008/0198928 A1 8/2008 Fujisawa et al.
2009/0208140 A1 * 8/2009 Jayant ................... G06T 7/0004 382/309
2010/0128791 A1 5/2010 LeFloch et al.
2010/0316126 A1 * 12/2010 Chen .................... H04N 19/124 375/240.16
2011/0102601 A1 5/2011 Davis
2011/0182356 A1 7/2011 Ammu
2011/0228859 A1 * 9/2011 Sugimoto ............ H04N 19/159 375/240.27
2014/0153640 A1 * 6/2014 Zhao .................... H04N 19/172 375/240.03

FOREIGN PATENT DOCUMENTS

EP 2373049 10/2011
WO WO2008049445 5/2008
WO WO2011121311 10/2011

OTHER PUBLICATIONS

Bex et al., "Spatial frequency, phase, and the contrast of natural images," Journal of Optical Society of America, vol. 19, No. 6, Jun. 2002, pp. 1096-1106.
Friston, "The free-energy principle: a unified brain theory?" Nature Reviews/Neuroscience, vol. 11, No. 2, pp. 127-138, Feb. 2010.
Search Report dated Sep. 26, 2013.
Mejia-Ocana, A.B. et al.: "Low-complexity motion based saliency map estimation for perceptual video coding", Proceedings of the 2011 2nd National Conference on Telecommunications (CONATEL), pp. 1-7.
Watson et al.: Image quality and entropy masking. *NASA Ames Research Center, Moffett Field, CA 940335-1000, Foothill College, Los Altos, Hills, CA. SPIE vol. 2016, 1997, 11 pages.

* cited by examiner

METHOD AND APPARATUS FOR VIDEO QUALITY ASSESSMENT BASED ON CONTENT COMPLEXITY

CROSS-REFERENCE TO RELATED APPLICATIONS

This application claims the benefit, under 35 U.S.C. § 365 of International Application PCT/CN2013/077846, filed Jun. 25, 2013, which was published in accordance with PCT Article 21(2) on Mar. 6, 2014 in English and which claims the benefit of WO patent application No. PCT/CN2012/080632, filed Aug. 27, 2012.

TECHNICAL FIELD

This invention relates to video quality measurement, and more particularly, to a method and apparatus for determining a video quality metric at a bitstream level. The determined video quality metric can then be used, for example, to adjust encoding parameters, or to provide required video quality at the receiver side.

BACKGROUND

Generally, the more textured or complex the video content is, the more artifacts in the video content can be tolerated by human eyes. That is, when a video content is viewed by human eyes, visual artifacts may be masked by the video content itself. This property of human eyes is known as masking property or masking effect. Thus, content complexity may be considered in visual quality assessment.

In our previous work, we estimate a content unpredictability (CU) parameter to indicate content complexity. In a commonly owned PCT application, entitled "Method and apparatus for video quality measurement" by F. Zhang, N. Liao, K. Xie, and Z. Chen (PCT/CN11/002096, hereinafter "Zhang1"), the teachings of which are specifically incorporated herein by reference, we disclosed a method for predicting video quality using a quantization parameter (QP), which is adjusted by a correction function that depends on content unpredictability.

In another commonly owned PCT application, entitled "Video quality measurement" by F. Zhang, N. Liao, K. Xie, and Z. Chen (PCT/CN2011/082870, hereinafter "Zhang2"), the teachings of which are specifically incorporated herein by reference, we disclosed a method for estimating a compression distortion factor, a slicing distortion factor, and a freezing distortion factor using parameters (for example, quantization parameters, content unpredictability parameters, ratios of lost blocks, ratios of propagated blocks, error concealment distances, motion vectors, durations of freezing, and frame rates) derived from a bitstream.

SUMMARY

The present principles provide a method for assessing video quality of a video included in a bitstream, comprising the steps of: determining a content unpredictability parameter responsive to prediction residuals of a block of a picture in the video; scaling the content unpredictability parameter responsive to the encoding configuration of the block; and determining a quality metric representative of video quality of the video included in the bitstream in response to the scaled content unpredictability parameter as described below. The present principles also provide an apparatus for performing these steps.

The present principles also provide a method for assessing video quality of a video included in a bitstream, comprising the steps of: determining a content unpredictability parameter responsive to prediction residuals and encoding configuration of a block of a picture in the video, wherein the content unpredictability parameter is indicative of a degree of difficulty of predicting the block; scaling the content unpredictability parameter responsive to the encoding configuration, wherein a value of the scaled content unpredictability parameter is substantially same as a value of a second content unpredictability parameter for another block that has similar content; and determining a quality metric representative of video quality of the video included in the bitstream in response to the determined content unpredictability parameter as described below. The present principles also provide an apparatus for performing these steps.

The present principles also provide a computer readable storage medium having stored thereon instructions for assessing video quality of a video included in a bitstream, according to the methods described above.

DETAILED DESCRIPTION

Figure 1A:
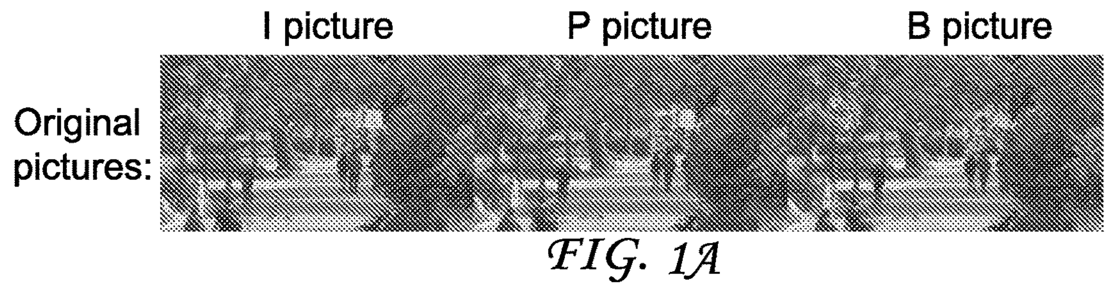
FIG. 1A is a pictorial example depicting three original pictures to be encoded as I, P, and B pictures, respectively.

It is known that variance and entropy may be used to measure complexity of natural images. For a general signal sequence, variance quantifies contrast or energy, while entropy evaluates randomness or uncertainty. The work described in A. B. Watson, R. Borthwick, and M. Taylor, "Image quality and entropy masking," SPIE Proceedings, vol. 3016, 1997, suggests that another complexity-related characteristic apart from contrast and randomness, called learn ability, may be used to measure content complexity.

Learn ability may be considered to be similar to predictability. That is, the more likely a signal can be represented by neighborhood, the higher its predictability and learn ability are. In video coding, intra prediction and inter prediction are commonly used to remove redundancy in the video. Specifically, a current block may be predicted from a previously encoded block, and the difference between the current block and the predicted block (i.e., prediction residual), rather than the current block itself, may be encoded. In general, when intra prediction or inter prediction work well, that is, when the current block can be predicted well from a previously encoded block, the prediction residual becomes small and/or sparse. Therefore, energy of prediction residuals in video coding may be a good indicator of how difficult a video signal can be predicted (i.e., content unpredictability). In the present embodiments, we use content unpredictability to represent content complexity.

When the content predictability parameter is defined based on prediction residuals, it can be computed as parameter to measure the degree of difficulty of predicting a video signal. Because the prediction residuals are available in the compressed domain, the content predictability parameter can be measured without full decoding or accessing decoded image pixels, and thus promote the computational efficiency of applications using CU parameters, such as QoE (quality of experience) assessment and video indexing.

Most existing video compression standards, for example, H.264 and MPEG-2, use a macroblock (MB) as the basic encoding unit. Thus, the following embodiments use a macroblock as the basic processing unit. However, the principles may be adapted to use a block at a different size, for example, an 8×8 block, a 16×8 block, a 32×32 block, or a 64×64 block.

In one embodiment, for each macroblock, the CU parameter can be computed using the variance or energy of prediction residuals, which is theoretically equal to the sum of the squared de-quantized DCT coefficients minus the squared sum of de-quantized DC coefficients. When no prediction is performed on a macroblock, the CU parameter can be computed as energy of pixels. That is, inverse DCT (IDCT) is not necessary for calculating the CU parameter. Given the QP and quantized DCT coefficients which are parsed from a bitstream, the de-quantized DCT coefficients can be estimated with sufficient precision in order to calculate CU parameters.

In an example, in Zhang 1, when H.264/AVC is used for encoding, the CU parameter for the r-th macroblock can be calculated as:

$$CU_r = \frac{(0.625\times 2^{QP_r/6})^2}{K_{MB}}\left[\sum_{l\subset r}\sum_{k\in l} DCT_{k,l}^2 - \left(\sum_{l\subset r}\frac{DCT_{0,l}}{|l|_r}\right)^2\right], \quad (1)$$

where constant $K_{MB}$ is the total number of pixels in a macroblock, i.e., 256 for H.264/AVC; $0.625\times 2^{QP_r/6}$ is an approximated formula of calculating a quantization step with respect to a QP value for H.264/AVC; I indexes the partitions in the r-th macroblock; $|I|_r$ denotes the total number of partitions therein, for example, 16 partitions for 4×4 block partitioning and 4 partitions for 8×8 block partitioning; non-negative k indexes the quantized DCT coefficients in the I-th partition of the r-th macroblock; and $DCT_{0,l}$ refers to the quantized DC coefficient in the l-th partition.

The above CU calculation can be applied to blocks (or Coding Unit/Prediction Unit in other standards, for example, HEVC) of any size and any partitions within a block. In the present application, a content unpredictability parameter calculated based on energy of prediction residuals, for example, as calculated in Eq. (1), is denoted as a raw CU parameter.

Prediction technique varies with encoding picture types. For example, I pictures support only intra-frame prediction and may have larger prediction residuals than P and B pictures. Due to inter-frame prediction, P pictures usually have smaller prediction residuals than I pictures. B pictures usually have smaller prediction residuals than both I and P pictures because of bi-directional inter-frame prediction. That is, different types of pictures contain prediction residuals of different numerical scales, even if the corresponding pictures may have similar contents (for example, the pictures belong to the same scene, or a similarity measure between the pictures is smaller than a threshold). Therefore, the raw CU parameters, calculated as prediction residual energy over pictures, depend on not only the video content but also the picture type, and thus may not accurately reflect the complexity of pictures.

Figure 1B:
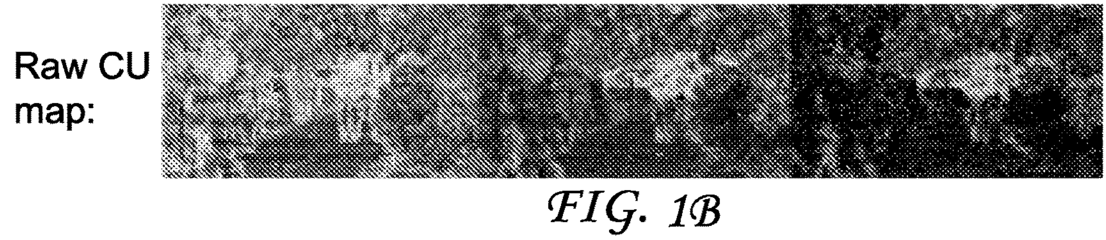
FIG. 1B is a pictorial example depicting raw CU parameters corresponding to FIG. 1A.

FIG. 1A shows three exemplary original pictures to be encoded as I, P, and B pictures, respectively. Corresponding raw CU parameters are illustrated in FIG. 1B. For visualization, CU parameter values are logarithmically mapped to pixel brightness (i.e., the brightness of a pixel in FIG. 1B corresponds to the value of a CU parameter at a macroblock in FIG. 1A). The brighter a pixel is, the larger the CU parameter is. While the three original pictures are very similar in image content and thus very similar in perceived content complexity, the I picture has the largest raw CU parameters and the B picture has the smallest raw CU parameters. Similar observations are also made in another example shown in FIGS. 2A and 2B.

Figure 3:
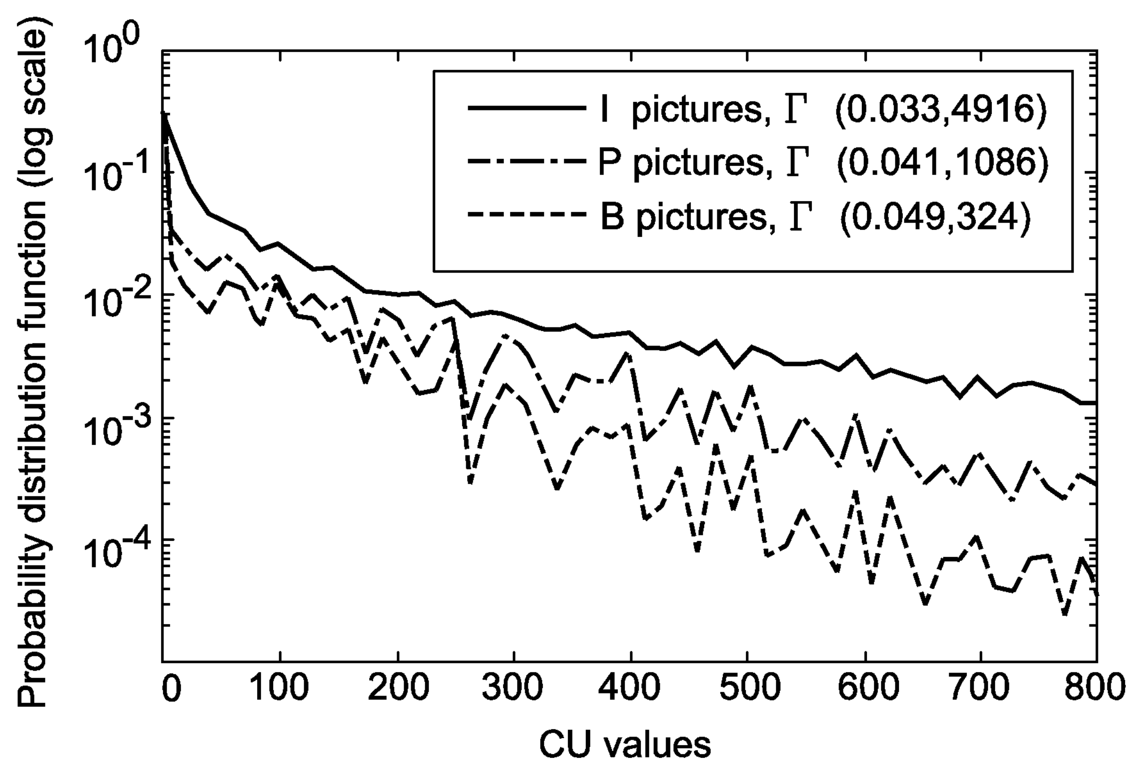
FIG. 3 is a pictorial example depicting raw CU parameter distributions for I, P, and B pictures, respectively.

FIG. 3 illustrates exemplary distributions of macroblocks' raw CU parameter values for different picture types. The probability distribution functions are approximated by normalized histograms with a bin width of 15 (i.e., intervals of raw CU parameter values). The raw CU parameters are calculated on all the macroblocks from I, P and B pictures, respectively, in consecutive 250 frames of a 576-line video. Overall, the raw CU parameters are the largest for I pictures, and smallest for B pictures. From I, P to B picture, the tail of the probability distribution curve gets thinner. The legend of FIG. 3 lists Γ distribution parameters, which are fitted for each type of pictures separately. In this example, we observe that the shape parameters (0.033 for I pictures, 0.041 for P pictures, and 0.049 for B pictures) are quite similar, while the scale parameters (4916 for I pictures, 1086 for P pictures, and 324 for B pictures) differ a lot.

From the examples shown in FIGS. 1-3, we observe that even when the perceived content complexity are very similar, the raw CU parameters may vary significantly with picture types. In order to more accurately measure content complexity, the present principles are directed to a method and apparatus for improving the estimated content unpredictability parameters taking into account the perceived variations described above. In particular, the raw CU parameters are scaled to align with CU parameters obtained in another encoding configuration such that the aligned CU parameters reflect the perceived content complexity more closely. After CU parameter alignment, the value of the aligned CU parameter of a current block in one encoding configuration is substantially the same as the value of the aligned CU parameter of another block in another encoding configuration, when the another block has similar content as the current block.

The proposed CU parameter alignment method is based on two general assumptions as discussed in the following.

Assumption 1 Raw CU parameter values of macroblocks conform to independent gamma distribution (Γ distribution). A random variable Y that is Γ-distributed with shape parameter k and scale parameter θ, denoted as $Y\sim\tau(k, \theta)$, has a probability distribution function:

$$f(y;k,\theta)=\frac{1}{\theta^k}\frac{1}{\Gamma(k)}y^{k-1}e^{-\frac{y}{\theta}}\text{ for }y\geq 0\text{ and }k,\theta>0. \tag{2}$$

Assumption 1 is based on the observation that the raw CU parameter of a macroblock is defined as the variance of pixels or prediction residuals, as well as the following lemma:

Lemma: if $x_1, x_2, \ldots, x_n$ are i.i.d. $\mathcal{N}(\mu, \sigma^2)$ random variables, their variance, $$\text{i.e., }\sum_{i=1}^{n}\left(x_i-\frac{1}{n}\sum_{i=1}^{n}x_n\right)^2,$$

conforms to a special case of the Gamma distribution, $$\Gamma\left(\frac{n-1}{2}, 2\sigma^2\right).$$

Strictly speaking, neither adjacent pixels nor residuals are independently Gaussian distributed, therefore we make a careful approximation that their variance conforms to a generalized Γ distribution $\Gamma(k, 2\sigma^2)$ with a relaxed shape parameter k, where k no longer equals (n−1)/2 exactly. Generally, the correlation and sparsity of adjacent pixels make k much smaller than (n−1)/2. Nevertheless, such correlation should be relatively consistent for the same visual content, despite of different encoding configurations. Therefore, we make the following assumption.

Assumption 2 Raw CU parameter distributions (of same or similar content), under different configurations, have a constant shape parameter k and possibly different scale parameters θ.

Based on the above assumptions, the problem of CU alignment becomes estimation of scale parameters & for different configurations. Assuming there are two configurations X and Y, the estimation problem can be solved by the maximum likelihood estimator of the distribution parameters on CU training sets $\{x\}_x$ and $\{y\}_Y$:

$$\arg\max_{k,\{\theta\}}\pi_{i=1}^{n_X}f(x_i;k,\theta_X)\pi_{i=1}^{n_Y}f(y_i;k,\theta_Y) \tag{3}$$

where x and y denote the raw CU parameter values of the MBs under configurations X and Y, respectively, and $n_X$ and $n_Y$ are the total number of sets $\{x\}_X$ and $\{y\}_Y$, respectively.

Subsequently, we can align the MB-wise CU for each configuration and obtain the aligned MB-wise CU (denoted as $\hat{CU}$), for example, as:

$$\hat{CU}_i=\begin{cases}CU_i\theta_Y/\theta_X & \text{if } MB_i \text{ is configured with } X\\ CU_i & \text{if } MB_i \text{ is configured with } Y\end{cases}. \tag{4}$$

In the following, we provide an exemplary embodiment for solving the estimation problem as described in Eq. (3). Referring to Eqs. (2) and (3), the log-likelihood is $$l(k,\{\theta\})=(k-1)(\Sigma_i\ln x_i+\Sigma_i\ln y_i)-(n_X+n_Y)\ln\Gamma(k)-(\Sigma_i x_i/\theta_X+\Sigma_i y_i/\theta_Y)-k(n_X\ln\theta_X+n_Y\ln\theta_Y).$$

Setting the derivative of log-likelihood with respect to $\theta_x$ to zero yields:

$$\frac{\partial\ell}{\partial\theta_X}=\sum_i x_i/\theta_X^2-kn_X/\theta_X=0,$$

and leads to the maximum likelihood estimator for $\theta_x$:

$$\hat{\theta}_X=\Sigma_i x_i/(kn_X).$$

Similarly, the maximum likelihood estimator for $\theta_Y$ can be derived as:

$$\hat{\theta}_Y=\Sigma_i y_i/(kn_Y).$$

Thus, without estimating k, we have:

$$\hat{\theta}_Y/\hat{\theta}_X=\frac{n_X\sum_i y_i}{n_Y\sum_i x_i}. \tag{5}$$

That is, Eq. (5) provides a ratio between scale parameters θ for configurations X and Y, wherein the ratio is also referred to as an alignment scaling factor, to scale the raw CU parameters in order to align them between configurations X and Y.

In one example, when ITU-T P.NBAMS (Parametric Non-intrusive Bitstream Assessment of video Media Streaming quality) databases are used for training, we derive alignment scaling factors and estimate the content complexity of a video sequence as an average value of aligned CU parameters for all available MBs in all pictures of the video sequence. In this example, the content complexity is refined as a weighted combination of CUs:

$$z_c=\frac{1}{T}\left(\sum_{t\in\{I\}}\sum_{r\in t}\frac{CU_r}{20.6\times|r|_t}+\sum_{t\in\{P\}}\sum_{r\in t}\frac{CU_r}{3.52\times|r|_t}+\sum_{t\in\{B\}}\sum_{r\in t}\frac{CU_r}{|r|_t}\right)+c, \tag{6}$$

where t∈{I},t∈{P} and t∈{B} represent I pictures, P pictures and B pictures, respectively, $CU_r$ is the raw content unpredictability parameter value of the r-th MB, T is the total number of pictures, c is a constant, and $|r|_t$ denotes the total number of partitions in the r-th MB. The constant 20.6 is the alignment scaling factor between I pictures and B pictures, and the constant 3.52 is the alignment scaling factor between P pictures and B pictures.

Figure 1C:
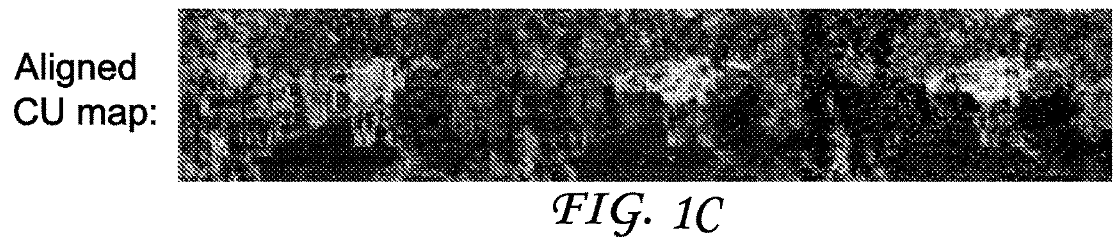
FIG. 1C is a pictorial example depicting aligned CU parameters, generated in accordance with an embodiment of the present principles.
Figure 2A:
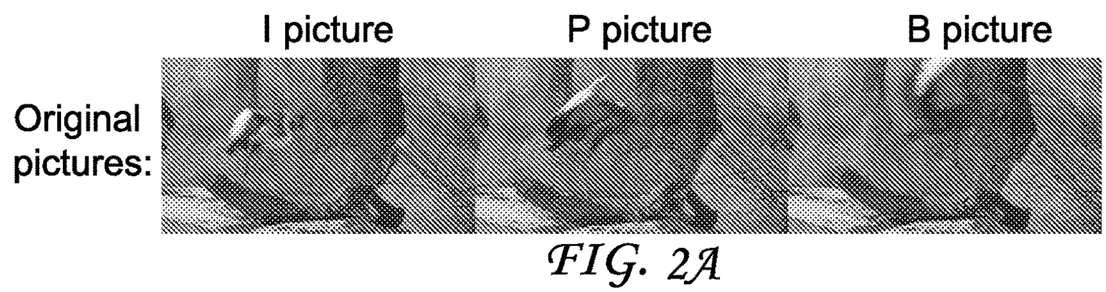
FIG. 2A is another pictorial example depicting another three original pictures to be encoded as I, P, and B pictures, respectively.
Figure 2B:
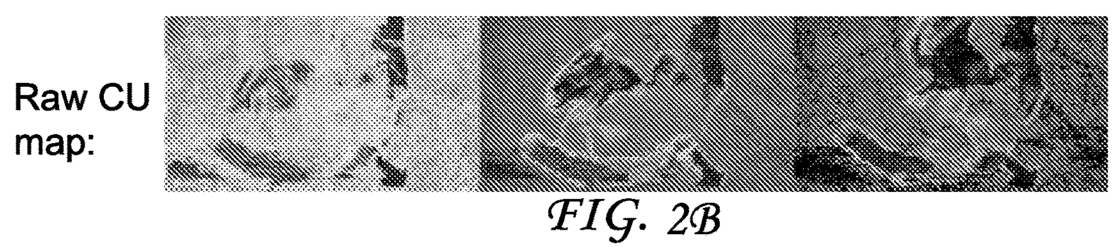
FIG. 2B is a pictorial example depicting raw CU parameters corresponding to FIG. 2A.
Figure 2C:
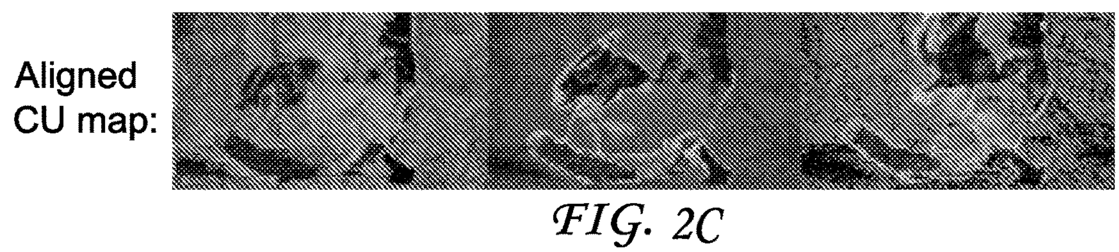
FIG. 2C is a pictorial example depicting aligned CU parameters, generated in accordance with an embodiment of the present principles.

For the examples of FIGS. 1A and 2A, the aligned CU parameters are illustrated in FIGS. 1C and 2C, respectively. Compared with raw CU parameters shown in FIGS. 1B and 2B, the aligned CU parameters are in a more similar scale across different picture types. Thus, the aligned CU parameters may better reflect the content complexity.

In addition to picture types, other encoding configurations, for example, the compression standard in use, the maximum consecutive B pictures, GOP (group of picture) structure, instantaneous refresh rate, and the total number of prediction directions of intra prediction, may affect prediction efficiency and thereby affect the average raw CU parameter values of B, P or I pictures, especially when I frames are used infrequently (i.e., a long GOP is used). Moreover, raw CU parameter values also depend on the video resolution and frame rate. For example, a higher resolution or frame rate often causes lower raw CU parameter values. Consequently, it is necessary to determine the alignment across different configurations. In one embodiment, depending on the encoding configurations, different training sets can be used and thus alignment scaling factors can be estimated accordingly. For example, a power function with respect to the resolution and a power function with respect to the frame rate can be used for alignment, which may keep aligned CU parameters independent with the configurations and only related to the content.

The estimated content unpredictability parameter for the video sequence, for example, $z_c$ in Eq. (6), can be used to replace $Q_c$ in Eq. (1) of Zhang1 (PCT/CN11/002096) for measuring video quality, or $CU_T$ in Eq. (3) of Zhang2 (PCT/CN2011/082870) for calculating the compression distortion factor. That is, the compression distortion factor may be calculated as:

$$d_c=(\log z_c)^{b1}\times(51-QP_T)^{b2}, \tag{7}$$

where $QP_T$ is an average QP for the video clip, and $b_1$ and $b_2$ are constants.

Combining the compression distortion factor and other distortion factors (for example, slicing distortion factor and freezing distortion factor), an overall video quality metric can be obtained for the video sequence. Since prediction residuals are available in a bitstream, the video quality measurement according to the present principles may be implemented on a bitstream level.

Using $z_c$ and other parameters, a quality metric may be calculated as:

$$q=\frac{MOS_{ub}-MOS_{lb}}{1+\alpha\left(a_c x_c^{b_{c0}} z_c^{b_{c1}} R^{b_{c2}} F^{b_{c3}}+a_f x_f^{b_{f0}} z_f^{b_{f1}}+a_s x_s^{b_{s0}} z_s^{b_{s1}}\right)^{\beta}}+MOS_{lb}, \tag{8}$$

where output variable q is the predicted quality score; constants $MOS_{ub}$ and $MOS_{ib}$ are the upper bound and lower bound of MOS (Mean Opinion Score), i.e., 5 and 1, respectively; α, β, {a} and {b} are model parameters ($a_c=1$ constantly); subscripts c, f and s indicate compression, freezing and slicing impairments respectively; variables {x} and {z} are model factors and also generally termed as features, which are extracted from video data; R is width*height/256; and F is the frame rate.Specifically, {x} and {z} are respectively the key factor and the co-variate associated with each type of impairment, for example, $x_c$ is the key factor for compression impairment and $z_s$ is the co-variate for slicing impairment.

Figure 4:
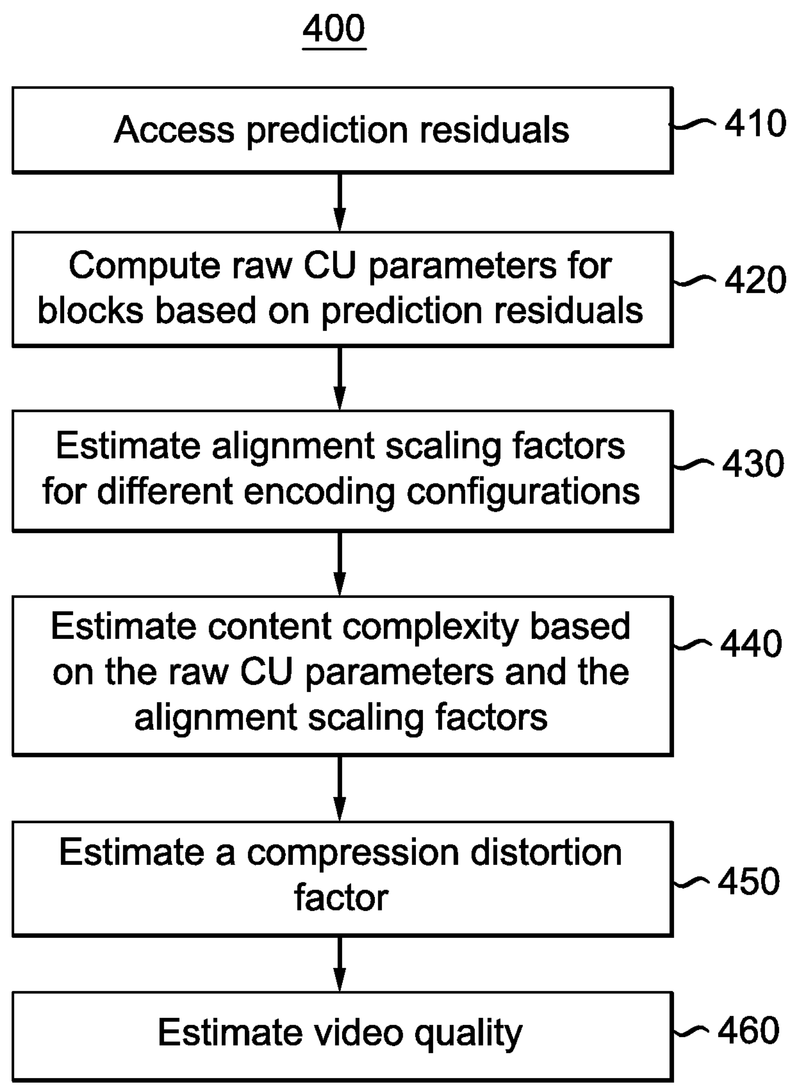
FIG. 4 is a flow diagram depicting an example for estimating video quality based on content complexity, in accordance with an embodiment of the present principles.

FIG. 4 illustrates an exemplary method 400 for measuring video quality based on content complexity according to an embodiment of the present principles. Method 400 starts at step 410, wherein prediction residuals are accessed, for example, from a bitstream. At step 420, raw CU parameters are calculated, for example, as energy of the prediction residuals as shown in Eq. (1). At step 430, alignment scaling factors for different encoding configurations are estimated, for example, using Eq. (5). Based on the raw CU parameters and alignment scaling factors, aligned CU parameters are estimated at step 440 to estimate the content complexity. At step 450, a compression distortion factor may be calculated based on the aligned CU parameters and other encoding parameters (for example, quantization parameters). Combining the compression distortion factor with slicing and/or freezing distortion factors, an overall video quality metric can be estimated at step 460, for example, using Eq. (8).

In addition to video quality measurement, the content unpredictability parameter can also be used in texture recognition, object recognition, or scene recognition.

Figure 5:
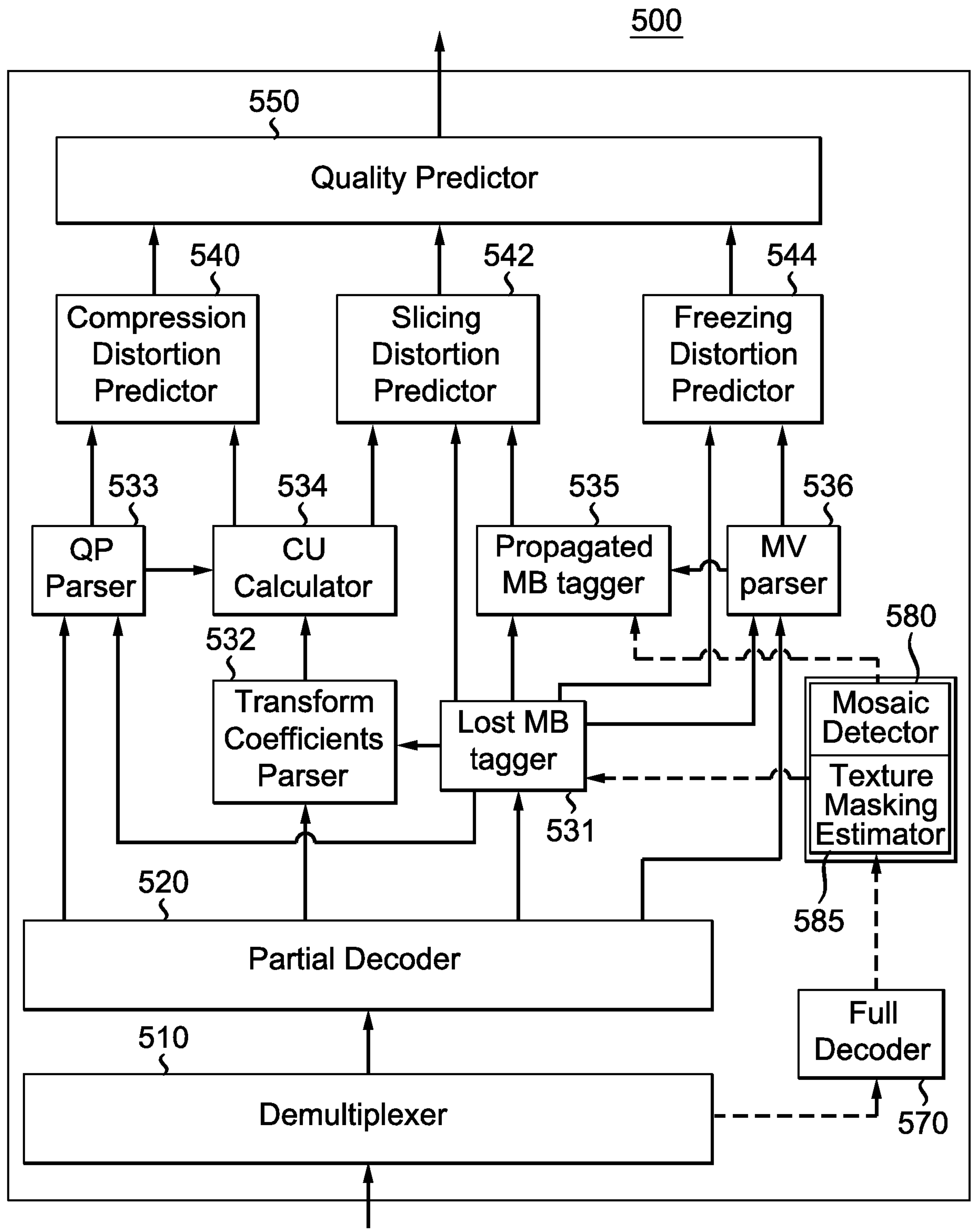
FIG. 5 is a block diagram depicting an example of a video quality measurement apparatus that may be used with one or more implementations of the present principles.

FIG. 5 depicts a block diagram of an exemplary video quality measurement apparatus 500 that can be used to generate a video quality metric. The input of apparatus 500 includes a transport stream that contains the bitstream. The input may be in other formats that contains the bitstream. A receiver at the system level determines packet losses in the received bitstream.

Demultiplexer 510 parses the input stream to obtain the elementary stream or bitstream. It also passes information about packet losses to decoder 520. The decoder 520 parses necessary information, including QPs, picture types, transform coefficients, and motion vectors for each block or macroblock, in order to generate parameters for estimating the quality of the video. The decoder also uses the information about packet losses to determine which macroblocks in the video are lost. Decoder 520 is denoted as a partial decoder to emphasize that full decoding is not performed, i.e., the video is not reconstructed.

Using the MB level QPs parsed from decoder 520, a QP parser 533 obtains average QPs for pictures and for the entire video clip. Using transform coefficients obtained from decoder 520, a transform coefficients parser 532 parses the coefficients. A content unpredictability parameter calculator 534 calculates the content unpredictability parameter for individual pictures and for the entire video clip, based on transform coefficients, quantization parameters, and encoding configurations. Using information about which macroblocks are lost, a lost MB tagger 531 marks which MB is lost. Further using motion information, a propagated MB tagger 535 marks which MBs directly or indirectly use the lost blocks for prediction (i.e., which blocks are affected by error propagation). Using motion vectors for blocks, an MV parser 536 calculates a motion parameter for MBs, pictures, and the entire video clip. Other modules (not shown) may be used to determine error concealment distances, durations of freezing, and frame rates.

A compression distortion predictor 540 estimates the compression distortion factor, a slicing distortion predictor 542 estimates the slicing distortion factor, and a freezing distortion predictor 544 estimates the freezing distortion factor. Based on the estimated distortion factors, a quality predictor 550 estimates an overall video quality metric.

When extra computation is allowed, a decoder 570 decodes the pictures. The decoder 570 is denoted as a full decoder and it will reconstruct the pictures and perform error concealment if necessary. A mosaic detector 580 performs mosaic detection on the reconstructed video. Using the mosaic detection results, the lost MB tagger 531 and the propagated MB tagger 535 update relevant parameters, for example, the lost block flag and the propagated block flag. A texture masking estimator 585 calculates texture masking weights. The texture masking weights can be used to weigh the distortions.

The video quality measurement apparatus 500 may be used, for example, in ITU-T P.NBAMS standard, which works on video quality assessment models in two application scenarios, namely, IPTV and mobile video streaming, also called HR (High Resolution) scenario and LR (Low Resolution) scenario respectively. The difference between the two scenario ranges from the spatio-temporal resolution of video content and coding configuration to transport protocols and viewing conditions.

The input to the P.NBAMS VQM (Video Quality Model) is coded video bitstream with all transmission packet headers (UDP/IP/RTP or UDP/IP/RTP/TS). The output is an objective MOS score. A major target application of P.NBAMS work is to monitor video quality in a set-top box (STB) or gateway. P.NBAMS mode 1 model only uses bitstream information, and mode 2 model may decode parts or all of the video sequence, and the pixel information is used for visual quality prediction in addition to parsing the bitstream information in order to improve the prediction accuracy.

Figure 6:
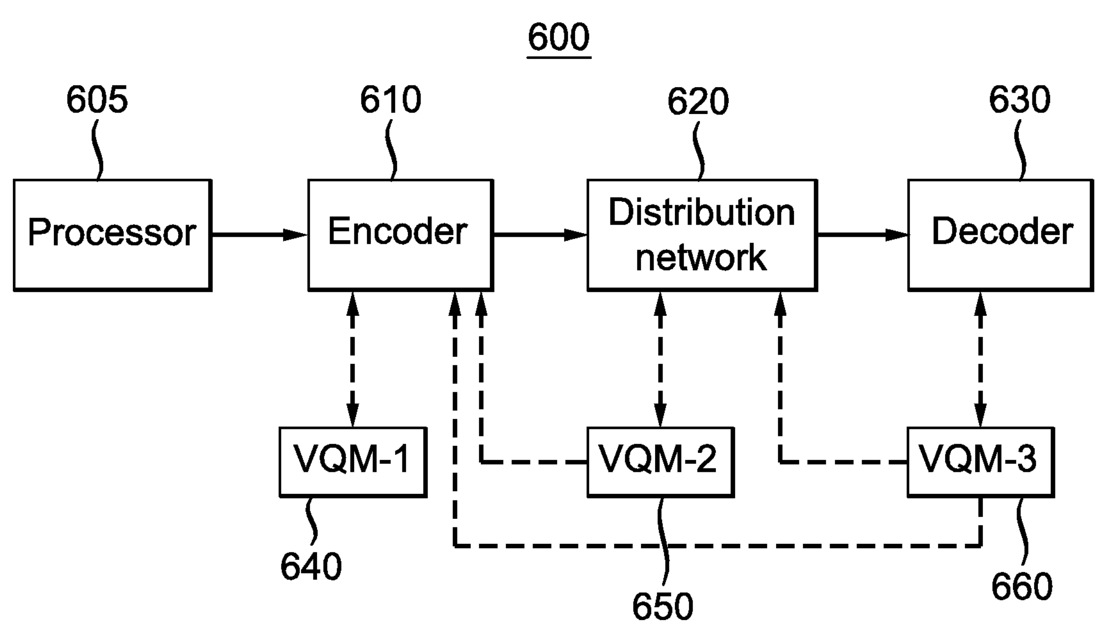
FIG. 6 is block diagram depicting an example of a video processing system that may be used with one or more implementations of the present principles.

Referring to FIG. 6, a video transmission system or apparatus 600 is shown, to which the features and principles described above may be applied. A processor 605 processes the video and the encoder 610 encodes the video. The bitstream generated from the encoder is transmitted to a decoder 630 through a distribution network 620. A video quality monitor or a video quality measurement apparatus, for example, the apparatus 500, may be used at different stages.

In one embodiment, a video quality monitor 640 may be used by a content creator. For example, the estimated video quality may be used by an encoder in deciding encoding parameters, such as mode decision or bit rate allocation. In another example, after the video is encoded, the content creator uses the video quality monitor to monitor the quality of encoded video. If the quality metric does not meet a pre-defined quality level, the content creator may choose to re-encode the video to improve the video quality. The content creator may also rank the encoded video based on the quality and charges the content accordingly.

In another embodiment, a video quality monitor 650 may be used by a content distributor. A video quality monitor may be placed in the distribution network. The video quality monitor calculates the quality metrics and reports them to the content distributor. Based on the feedback from the video quality monitor, a content distributor may improve its service by adjusting bandwidth allocation and access control.

The content distributor may also send the feedback to the content creator to adjust encoding. Note that improving encoding quality at the encoder may not necessarily improve the quality at the decoder side since a high quality encoded video usually requires more bandwidth and leaves less bandwidth for transmission protection. Thus, to reach an optimal quality at the decoder, a balance between the encoding bitrate and the bandwidth for channel protection should be considered.

In another embodiment, a video quality monitor 660 may be used by a user device. For example, when a user device searches videos in Internet, a search result may return many videos or many links to videos corresponding to the requested video content. The videos in the search results may have different quality levels. A video quality monitor can calculate quality metrics for these videos and decide to select which video to store. In another example, the decoder estimates qualities of concealed videos with respect to different error concealment modes. Based on the estimation, an error concealment that provides a better concealment quality may be selected by the decoder.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for assessing video quality of a video included in a bitstream, wherein the method is configured to be executed on a processor, the method comprising:

determining a parameter responsive to a variance of prediction residuals of a block of a picture in the video;

adjusting the determined parameter responsive to encoding configuration of the block, wherein the encoding configuration includes at least one of a picture type and GOP (Group of Picture) structure; and determining a quality metric, representative of video quality of the video included in the bitstream, in response to the adjusted parameter.

2. The method of claim 1, wherein a scaling factor used for adjusting the determined parameter in an I picture is smaller than a scaling factor used for adjusting the determined parameter in a P picture.

3. The method of claim 1, wherein a scaling factor used for adjusting the determined parameter is determined on the basis that the prediction residuals follow a gamma distribution.

4. The method of claim 3, wherein respective scaling factors are determined for a plurality of encoding configurations, on the basis that a shape parameter of the gamma distribution for the encoding configuration is same as another shape parameter for another encoding configuration.

5. The method of claim 1, wherein the parameter is determined for each one of a plurality of blocks in the video, and wherein an overall parameter for the video is determined responsive the determined parameters for the plurality of blocks.

6. The method of claim 1, farther comprising:

performing at least one of monitoring quality of the bitstream, adjusting the bitstream in response to the quality metric, creating a new bitstream based on the quality metric, adjusting parameters of a distribution network used to transmit the bitstream, determining whether to keep the bitstream based on the quality metric, and choosing an error concealment mode at a decoder.

7. The method of claim 1, wherein the determining the quality metric is further in response to at least one of a resolution and frame rate.

8. An apparatus for assessing video quality of a video included in a bitstream, comprising at least a memory and one or more processors, wherein the one or more processors are configured to:

access prediction residuals for a block of a picture of the video and determine encoding configuration of the block;

determine a parameter responsive to a variance of prediction residuals of the block, and adjust the determined parameter responsive to the encoding configuration of the block, wherein the encoding configuration includes at least one of a picture type and GOP (Group of Picture) structure; and determine a quality metric, representative of video quality of the video included in the bitstream, in response to the adjusted parameter.

9. The apparatus of claim 8, wherein a scaling factor used to adjust the determined parameter in an I picture is smaller than a scaling factor used to adjust the determined parameter in a P picture.

10. The apparatus of claim 8, wherein the one or more processors are configured to determine a scaling factor for adjusting the determined parameter on the basis that the prediction residuals follow a gamma distribution.

11. The apparatus of claim 10, wherein respective scaling factors are determined for a plurality of encoding configurations, on the basis that a shape parameter of the gamma distribution for the encoding configuration is same as another shape parameter for another encoding configuration.

12. The apparatus of claim 8, wherein the parameter is determined for each one of a plurality of blocks in the video, and wherein an overall parameter for the video is determined responsive the determined parameters for the plurality of blocks.

13. The apparatus of claim 8, wherein the one or more processors are further configured to perform:

at least one of monitoring quality of the bitstream, adjusting the bitstream in response to the quality metric, creating a new bitstream based on the quality metric, adjusting parameters of a distribution network used to transmit the bitstream, determining whether to keep the bitstream based on the quality metric, and choosing an error concealment mode at a decoder.

14. The apparatus of claim 8, wherein the one or more processors are configured to determine the quality metric further in response to at least one of a resolution and frame rate.

15. A computer readable storage medium having, stored thereon instructions, for assessing video quality of a video included in a bitstream, configured to perform:

determining a parameter responsive to a variance of prediction residuals of a block of a picture in the video;

adjusting the determined parameter responsive to encoding configuration of the block, wherein the encoding configuration includes at least one of a picture type and GOP (Group of Picture) structure; and determining a quality metric, representative of video quality of the video included in the bitstream, in response to the scaled parameter.

16. The medium of claim 15, wherein a scaling factor used for adjusting the determined parameter in an I picture is smaller than a scaling factor used for adjusting the determined parameter in a P picture.

17. The medium of claim 15, wherein a scaling factor used for adjusting the determined parameter is determined on the basis that the prediction residuals follow a gamma distribution.

18. The medium of claim 17, wherein respective sealing factors are determined for a plurality of encoding configurations, on the basis that a shape parameter of the gamma distribution for the encoding configuration is same as another shape parameter for another encoding configuration.

19. The medium of claim 15, wherein the determining the quality metric is further in response to at least one of a resolution and frame rate.

* * * * *